United States Patent [19]

McGarry et al.

[11] 3,853,690

[45] Dec. 10, 1974

[54] METAL SUBSTRATES BONDED WITH THERMOSETTING RESIN COMPOSITIONS CONTAINING FIBRILLATED POLYTETRAFLUOROETHYLENE

[75] Inventors: Frederick Jerome McGarry, Weston, Mass.; Tzeng Jiueq Suen, New Canaan, Conn.

[73] Assignee: American Cyanamid Company, Stamford, Conn.

[22] Filed: June 23, 1972

[21] Appl. No.: 265,848

[52] U.S. Cl.............. 161/189, 161/214, 161/215, 161/176, 161/68, 156/330 R, 156/332, 156/333, 156/335, 260/29.2, 260/37 EP, 260/836, 260/837, 260/847, 260/853, 260/862, 260/900
[51] Int. Cl........................ B32b 27/06, C09j 3/14
[58] Field of Search ............ 161/189; 260/29.2, 14; 156/330 R, 333, 332, 335

[56] References Cited
UNITED STATES PATENTS

| | | | |
|---|---|---|---|
| 3,231,460 | 1/1966 | Andrews | 161/189 |
| 3,304,221 | 2/1967 | Eggleton | 161/189 |
| 3,380,879 | 4/1968 | Schonhorn et al. | 161/189 X |
| 3,664,915 | 5/1972 | Gore | 161/189 X |

*Primary Examiner*—George F. Lesmes
*Assistant Examiner*—Patricia C. Ives
*Attorney, Agent, or Firm*—Frank M. Van Riet

[57] ABSTRACT

Various substrates are bonded together with adhesives comprising a thermosetting resin containing from about 1 percent to about 40 percent of polytetrafluoroethylene. The resultant articles exhibit excellent structural properties and find use in such areas as the aerospace industry.

8 Claims, No Drawings

METAL SUBSTRATES BONDED WITH THERMOSETTING RESIN COMPOSITIONS CONTAINING FIBRILLATED POLYTETRAFLUOROETHYLENE

BACKGROUND OF THE INVENTION

This invention relates to structural articles of manufacture comprising substrates bonded together with an adhesive comprising a physical blend of a thermosetting resin and polytetrafluoroethylene.

Compositions comprising thermosetting resins having blended therewith polytetrafluoroethylene are well known to those skilled in the art. For example, U.S. Pat. No. 3,322,710 discloses the incorporation of fibrous polytetrafluoroethylene into such resins as phenolics, phenol-formaldehyde resins, melamine-formaldehyde resins etc. while U.S. Pat. No. 2,976,257 teaches particles of polytetrafluoroethylene in conjunction with such resins as epoxy resins, alkyd resins and the like. The resultant compositions are said to be useful for bearings and bushings and as corrosion resistant coatings.

SUMMARY

We have now discovered that the addition of polytetrafluoroethylene to thermosetting resins, preferably epoxy resins, unexpectedly enables the resultant compositions to be useful as adhesives in the production of structural articles of manufacture having unexpectedly excellent peel strengths. These adhesives enable the production of bonded articles, especially those produced from metal sheets, the resultant laminates finding exceptional utility in the areospace industry.

DESCRIPTION OF THE INVENTION INCLUDING PREFERRED EMBODIMENTS

The polytetrafluoroethylene (hereinafter sometimes referred to as PTFE) used to prepare the instant compositions must be fibrillated in order to contribute the desirable properties to the thermosetting adhesive system. Fibrillation of the PTFE can be carried out in any manner and is well known to those skilled in the art. The fibrillation of the PTFE can be effected before or after the PTFE is blended with the resin, however, it is preferred that the PTFE be fibrillated before blending. The PTFE can be used in the form of a powder or a latex and fibrillation can be effected by subjecting the PTFE powder or latex to the shearing action of a mixing apparatus such as a ball mill, rubber mill, etc. as is described in the two above-mentioned U.S. patents which are hereby incorporated herein by reference.

The PTFE is compounded with the thermosetting resin in amounts ranging from about 1 percent to about 40 percent, by weight, preferably from about 5 percent to about 25 percent, by weight, based on the weight of the thermosetting resin.

Any thermosetting resin may be utilized in forming the novel articles of the present invention. The thermosetting resins are converted to the cured state after blending with the PTFE. The adhesive may be used as a film or tape containing a latent catalyst or as a liquid containing a catalyst, which liquid is coated on the substrate to form the desired article of manufacture therefrom. In this regard, we can utilize aminoplast resins such as the urea-formaldehyde resins; aminotriazinealdehyde resins, i.e. melamine-formaldehyde resins; benzoguanamine-formaldehyde resins; acetoguanamine-formaldehyde resins and the like. Frequently these aminoplast resins are alkylated in order to improve their properties, especially when utilized as coating resins. In this connection, attention is directed to U.S. Pat. No. 2,197,357 and U.S. Pat. No. 3,293,037 which are illustrative of the aminotriazine-aldehyde resins useful herein and which patents are incorporated herein by reference. These resins and the earlier urea resins have been available commercially in a wide variety of species from a plurality of commercial sources for several decades, and are exceedingly well known in the art.

Additionally, we can use the polyester resin compositions such as those prepared by reacting an α, β-ethylenically unsaturated dicarboxylic acid with a polyhydric alcohol and preferably with a glycol and used either with or without a cross-linking agent such as a polymerizable monomer of which monomeric styrene is illustrative. In this connection, attention is directed to the U.S. Pat. Nos. 2,255,313 and 2,443,73541, inclusive.

Additionally, and most preferably, we can make use of all types of epoxy resins such as those based on aniline, those prepared by reacting epichlorohydrin with bisphenol A, those based on bis-2,3-epoxy cyclopentyl ether, those taught in U.S. Pat. Nos. 3,218,287 3,386,955, 3,386,956 and 3,222,321, also incorporated herein by reference etc. Generally, any epoxy resin which cures to a thermoset condition over a temperature range of 70°F.–400°F. can be used.

Furthermore, we can make use of the phenolic resins which are prepared by reacting phenol per se or any of the substituted phenols such as cresol, p-phenylphenol, p-benzylphenol and the like with an aldehyde such as formaldehyde. Also included in this class of resins are reaction products of these phenolic resins with epihalohydrins such as epichlorohydrin.

A further example of useful thermosetting resins are the alkyd resins and particularly those which have been modified with any of the conventionally used glyceride oils or the long chain fatty acids derived therefrom. A particularly advantageous type of alkyd resin is one prepared by reacting and esterifying a phthalic acid and a dimer acid of an ethylenically unsaturated aliphatic monocarboxylic acid having from 14 to 22 carbon atoms with any of the glycols such as ethylene glycol, diethylene glycol, and the like. In this connection, attention is directed to U.S. Pat. No. 3,158,584. This dimer acid modified alkyd resin is a cross-linkable polymeric material, but requires the use of a cross-linking agent and the catalyst in order to achieve a conversion from the thermosetting to the thermoset state. A suitable cross-linking agent for use when said dimer acid alkyd resin is hexakismethyoxymethyl melamine. The amount of the cross-linking agent is clearly shown in the above cited patent directed to such dimer acid alkyd resins.

Additionally, such thermosetting resins as the polyimides, polyquinoxolines, polybenzamidazoles and the like may also be employed.

The substrates employed in the production of our novel articles of manufacture include such materials as metals including aluminum, titanium, steel, carbon steel, etc.; fibrous materials such as glass fiber or fabric, graphite fiber, high modulus nylon, boron filament etc.; honeycomb-type composites; paper; leather; plastics; ceramics; and the like.

The fibrillated PTFE, recovered from the fibrillation medium, may be handled in latex or dry form, but is preferably slurried with a convenient amount of solvent for the ultimate adhesive system. The PTFE can be blended with the thermosetting resin, preferably along with a curing agent for said resin, in any known type of mixing device such as an extruder, Banbury mixer, etc. Alternatively, a latex or powder form of PTFE can be added to the resin and then fibrillated.

The adhesives can be compounded with pigments, dyes, binders, catalysts, UV absorbers, inhibitors, stabilizers, lubricants and the like.

The following examples are set forth for purposes of illustration only and are not meant to be construed as limitations on the present invention. All parts and percentages are by weight unless otherwise specified.

EXAMPLE 1

Three hundred and fifty parts of a commercially available, solid, bisphenolic epoxy resin, are fluxed at about 80°C. on a 6 inch, two-roll mill. Into this flux are gradually blended 250 parts of a 60 percent aqueous latex of polytetrafluoroethylene (PTFE), evaporating the water to yield a blend of 350 parts of epoxy/150 parts PTFE. This blend is then milled at high shear for 15–20 minutes to convert the PTFE into a fine fibrillar form, and then is diluted with an additional 150 parts of a commercially available liquid, bisphenolic epoxy resin. The mill roll temperature is reduced, and milling is continued for another ten minutes. When the temperature is below 40°C., 56 parts of 1,1'-m-tolylenebis(3,3-dimethyl urea) and 35 parts of dicyandiamide are added and blended as a latent curing catalyst.

The resultant composition is removed from the mill and consolidated into a thin film, about 10 mils thick by melt pressing.

The adhesive film is then evaluated by structurally bonding it to two aluminum sheets (20 mils thick) which are first cleaned and prepared for useby the F.P.L. chromic-sulfuric etch per the aerospace industry standards. The resultant specimen is cured under a pressure of 40 p.s.i. and a temperature of 250°F. for 1 hour. The recovered laminate is tested and found to have a 75°F. lap shear strength of 5,200 p.s.i. and a T-peel strength of 40 pounds/inch.

EXAMPLE 2

PTFE is fibrillated by blending a dispersion of PTFE into a poly(methylmethacrylate) (PMMA) flux on a 6 inch, two-roll mill at 175°C., and milling for 20 minutes. After the fibrillation is achieved, the material is removed from the mill, cooled, and ground in a suitable grinding device, previously cooled at −60°C., until all material passes a 40 mesh screen (250 micron openings), and 60 percent of the material passes a 150 mesh screen, (125 micron openings). The PMMA is removed from the resulting powder through a series of extractions with methylene chloride.

An epoxy novolac resin vehicle was prepared as follows:

A mixture of 40 parts of a commercially available solid epoxy resin derived from an o-cresol/formaldehyde novolac reacted wtih epichlorohydrin and having a molecular weight of about 1,200, 10 parts of a second commercially available liquid epoxy resin derived from a polyglycidyl ether-phenol/formaldehyde novolac, 50 parts of aluminum powder, 25 parts of fibrillar PTFE, (solvent extracted, as above), 5 parts of dicyandiamide, and 5 parts of crystalline silica filler were dispersed in methylene chloride and drawn into a film. After evaporation of the solvent at 140°F. for 1 hour, the film is formed into an aluminum laminate as in Example 1, except the sample is cured for one hour at 350°F. The sample tested exhibits a 20 lb./in. R.T. T-peel, and a 3100 p.s.i. R.T. lap shear strength.

EXAMPLE 3 (Comparative)

Example 2 is precisely repeated except that the PTFE material is not incorporated. This sample exhibits a T-peel of 4 lbs./in.

EXAMPLE 4

The preparation technique described in Example 1 is employed, except that the adhesive system is constituted of 55 parts of the solid epoxy resin of Example 1, 45 parts of the liquid epoxy resin of Example 1, 20 parts fibrillated PTFE, 4 parts 1,1'-m-tolylenebis(3,3-dimethyl urea), and 8 parts dicyandiamide. Tested in the production of an aluminum laminate, excellent bond strengths were recorded as shown in Table I, below.

Table I

| Temp. °F. | Bond Strength |
| --- | --- |
| 75 | 4500 |
| 140 | 5800 |
| 180 | 5700 |

EXAMPLE 5

A sandwich structure typical of the aerospace industry was prepared with the adhesive of Example 4. Twenty mil aluminum skins, prepared as in Example 1, were bonded with a film of the adhesive at a weight of 0.08 lbs./sq. ft. to an aluminum honeycomb core (⅛ inch cell size, 0.0047N, 5052 aluminum). This specimen, tested by the standard climbing drum procedure, gave a sandwich peel of 60 lbs./3 in. width.

EXAMPLE 6

The procedure of Example 1 is followed except that a commercially available melamine-formaldehyde resin is substituted for the epoxy resin used therein and the metal is titanium. Upon testing of a laminate produced from the resultant blend, results comparable to those set forth in said example are observed.

EXAMPLE 7

The procedure of Example 6 is again followed except that the commercially available melamine-formaldehyde resin is methylated. Similar results are achieved.

EXAMPLE 8

Following the procedure of Example 1 except that 70 parts of a commercially available thermosetting polyester resin are used, the metal is carbon steel, 30 parts of fibrillated PTFE are added thereto and 3.5 parts of styrene are added to cross-link said polyester resin, a similar laminate is produced.

EXAMPLE 9

The procedure of Example 1 is again followed except that a commercially available phenol-formaldehyde resin is employed in place of the epoxy resin thereof and the metal is brass. Results similar to those of said example are recorded.

EXAMPLE 10

The procedure of Example 8 is followed except that 80 parts of a commercially available alkyd resin produced from phthalic anhydride, a dimer acid and ethylene glycol is used in place of the polyester thereof. 20 Parts of fibrillated PTFE are added along with 4.0 parts of hexakismethoxymethyl melamine cross-linking agent and the system is cross-linked under known conditions. An excellent laminate is recovered.

We claim:

1. A structural article of manufacture comprising at least two metal substrates bonded together with an adhesive consisting essentially of a mixture of (1) a thermosetting resin and (2) from about 1% to about 40%, by weight, based on the weight of (1), of fibrillated polytetrafluoroethylene.

2. An article according to claim 1 wherein said thermosetting resin is an epoxy resin.

3. An article according to claim 1 wherein said thermosetting resin is a polyester resin.

4. An article according to claim 1 wherein said thermosetting resin is an aminoplast resin.

5. An article according to claim 1 wherein said thermosetting resin is an alkyd resin.

6. An article according to claim 1 wherein said thermosetting resin is a phenolic resin.

7. A method for the production of structural articles of manufacture comprising contacting opposing surfaces of at least two metal substrates with an adhesive composition consisting essentially of a mixture of (1) a thermosetting resin and (2) from about 1 percent to about 40 percent, by weight, based on the weight of (1), of fibrillated polytetrafluoroethylene and then curing said adhesive.

8. A method according to claim 7 wherein said thermosetting resin is an epoxy resin.

* * * * *